(12) United States Patent
Smith et al.

(10) Patent No.: US 6,585,306 B1
(45) Date of Patent: Jul. 1, 2003

(54) INTERLOCKING DECK SUPPORT SYSTEM

(75) Inventors: Steven L. Smith, Buford, GA (US); Kevin Sullivan, Cumming, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 0 days.

(21) Appl. No.: 10/062,360

(22) Filed: Feb. 1, 2002

(51) Int. Cl.⁷ .............................................. B62D 33/04
(52) U.S. Cl. ..................................................... 296/24.1
(58) Field of Search .................... 105/375; 296/181, 296/24.1; 248/235, 240, 240.3, 244–246, 240.4; 410/129, 141; 108/44

(56) References Cited

U.S. PATENT DOCUMENTS

| | | |
|---|---|---|
| 355,277 A | 12/1886 | Newell |
| 2,584,506 A | 2/1952 | Shreve |
| 2,605,912 A | 8/1952 | Small et al. |
| 3,000,666 A | 9/1961 | Fernandes |
| 3,680,491 A | 8/1972 | Chapman et al. |
| 3,874,009 A | 4/1975 | Nosaka et al. |
| 3,875,871 A | 4/1975 | Thornton et al. |
| 3,897,971 A | 8/1975 | Evans |
| 3,905,309 A | 9/1975 | Suter |
| 3,911,832 A | 10/1975 | Vandergriff |
| 4,079,677 A | 3/1978 | Vandergriff et al. |
| 4,094,546 A | 6/1978 | Glassmeyer et al. |
| 4,191,109 A | 3/1980 | Wickenberg |
| 4,281,870 A | 8/1981 | Ehrlich et al. |
| 4,659,132 A | 4/1987 | Day |
| 4,995,322 A | 2/1991 | Frederick |
| 5,042,863 A | 8/1991 | Fraga |
| 5,261,771 A | 11/1993 | Marsch |
| 5,306,064 A | 4/1994 | Padovano et al. |
| 5,314,276 A | 5/1994 | Barone |
| 5,375,534 A | 12/1994 | Adams |
| 5,452,972 A | 9/1995 | Adams |
| 5,690,466 A | 11/1997 | Gaddis et al. |
| 5,836,636 A | 11/1998 | Adams |

FOREIGN PATENT DOCUMENTS

EP 0005960 12/1979

*Primary Examiner*—Dennis H. Pedder
(74) *Attorney, Agent, or Firm*—Alston & Bird LLP

(57) ABSTRACT

A deck support system for supporting cargo in a freight compartment is provided. The system includes at least one pair of deck panels mounted opposite one another on the side walls of the freight compartment, which are capable of movement between a secure upright position and an extended horizontal deployed position. When the deck panels are in their extended position they at least partially define a platform above the floor of the vehicle freight compartment. The system also includes a support bracket that is secured to each respective deck panel when in the deployed position and adjacent the free end of the deck panels. The bracket has an elongated body, a longitudinally extending channel for engagement with the deck panels and a longitudinally extending support ledge. The longitudinally extending channel interlocks the deployed deck panels and the longitudinally extending support ledge provides support to further pairs of deployed deck panels.

25 Claims, 7 Drawing Sheets

INTERLOCKING DECK SUPPORT SYSTEM

FIELD OF THE INVENTION

The invention relates to intermediate deck structures for use in transport vehicles such as trucks and trailer vans, railway cars, freight containers and the like, and more particularly, to an interlocking deck support system for use in such vehicles.

BACKGROUND OF THE INVENTION

In a typical truck van, a horizontal bed or floor is provided for supporting articles being transported. Articles are placed on this bed, and depending upon the size of the articles, they may be stacked upon each other at two or more levels.

In some instances, it may be impractical to stack the articles due to the weight or configuration. Where this is the case, a substantial amount of the vehicle interior is rendered unusable. For example, where the articles or containers are fragile, damage to the articles will occur if stacked to the extent that the weight of the upper articles would damage lower articles. In those instances, it is often necessary to avoid stacking or to minimize the amount of stacking.

Some articles are also somewhat difficult to handle due to their weight and configuration. This creates problems for the individuals loading the articles on a bed. Thus, even if articles at a lower level will not be damaged when other articles are stacked thereon, stacking itself may be quite cumbersome and inefficient due to the size and weight of the articles.

Attempts have been made to address some of these problems by incorporating intermediate decks in vehicles. Various types of collapsible or removable intermediate deck structures have been proposed for supporting freight articles of various shapes and weights above the horizontal bed or floor of a transport van, and the like, in order to increase the load carrying ability of a van and to maximize the use of the available cubic capacity of a van. The use of collapsible or removable intermediate decks has not met with wide success, however, due to inefficiencies in the design of the decks which make them too complex, too expensive for practical purposes or simply too inconvenient to use.

The design of existing intermediate deck structures often consist of two deck panels, hinge mounted on opposing walls to enable storage of the deck panels vertically against the side walls. The deck panels rotate downwardly or upwardly on the hinges to a horizontal position to form a continuous section of deck, or secondary floor. Typically, this form requires a means of supporting the deck halves horizontally in a manner which both encroaches on additional usable volume for loading the freight or cargo, and interferes with that space requiring extra effort and time to load around it. Such supports include cantilever support structures, suspension chains or cables or even vertical support legs extending to the primary floor.

For example, U.S. Pat. No. 3,911,832 to Vandergriff discloses an intermediate deck structure for use in railway cars, truck and trailer vans. The deck structure includes a first section pivotally connected at its outer end to the side wall of a vehicle, and adapted to be pivoted between a stored position adjacent the side wall and a horizontal position with its inner end extending inwardly from the side wall. A second section of the Vandergriff intermediate deck has a pair of arms extended from its inner end which are pivotally connected to the first section at a point between the inner and outer ends. The second section of the intermediate deck is adapted to be stored adjacent the side wall of the vehicle below the first section of the intermediate deck in a position extending downwardly from the outer end of the stored first section. The second section is adapted to be pivoted relative to the first section during pivoting of the first section to a horizontal loading position, whereby the second section can also be moved to a horizontal loading position with the outer end of the second section supported by a pair of load brackets engaged with a load rail on the opposite side wall of the vehicle.

A problem encountered with the intermediate deck structure of Vandergriff is that the individual deck structures do not lock together when the two deck sections are stored against the side wall of the vehicle, and the load bracket on the second section extends downwardly to a position where it can interfere with and damage cargo and boxes sitting on the main floor of the vehicle. A further problem with the Vandergriff deck is that the load brackets employed in the intermediate deck structure are subject to jumping out of the wall load track rail slots, causing the load brackets to retract under a load on the deck, and dropping the load onto the cargo positioned underneath the intermediate deck.

U.S. Pat. No. 5,452,972 to Adams discloses a deck structure for use in supporting cargo at an intermediate level above the floor or bed of a trailer van. The Adams intermediate deck includes a first deck section pivotally mounted on a side wall of a trailer van and movable to a horizontal load position, and back up to a vertical stored position against the side wall. Adams employs a complex spring slam bolt and release chain system engaged with a height saving angle locking rail to releaseably hold the deck section. A second section of the deck is pivotally connected to the first section and it is also movable between a horizontal load position and a vertical stored position against the side wall. When the second section is in the vertical stored position it is hanging from the first section and is configured such that it nests in the first deck section to provide a storing intermediate deck structure. When the first and second deck sections are in a horizontal load position, the second section has an outer end which is selectively provided with either the spring biased, telescopically mounted load bracket, or a cap style load bracket, that is operatively seated on a load track rail on the trailer van wall opposite to the wall on which the first deck section is hinged. Although the intermediate deck structure of Adams addresses some of the problems of Vandergriff, in doing so it employs complex chain and spring systems that increase the expense of the intermediate deck structure and enhance the risk of injury to the operator of the system. Also, like Vandergriff, Adams fails to address the problem of the lack of structure to lock individual deck structures together.

U.S. Pat. No. 3,875,871 to Thorton discloses a freight carrier such as a railroad car having sections which, unlike the structures in Vandergriff or Adams, fold from opposite walls toward one another from a stored position to an operational position. In the installed position the sections provide a supplementary cargo level. According to Thorton, in this position the sections have joining means which self-support the load and transmit lading shearing and bending moments between the sections so that additional supports from the floor are not required. The deck sections of the Thorton carrier are provided with flanges or blocks for supporting the sections when they are unfolded and for providing a resting space for subsequently lowered sections. Thorton also describes permanent support areas positioned at one end of the freight car designed to provide a resting area for the first lowered panels. The patent describes these rest areas as a bracket or ledge mounted on the rear wall of the carrier by suitable fasteners or welding.

Although Thorton seemingly overcomes many of the problems of Vandergriff and the complexities of Adams, it requires welding structures or fasteners to the interior portion of the carrier to do so. Moreover, although Thorton provides flanges or blocks for supporting subsequent sections, the panels described in Thorton are vulnerable to sag under heavier loads due to inadequate support. Moreover, the flanges or blocks of Thorton subject the panels to interference with one another and, like Vandergriff and Adams, do not interlock the panels together in the operational position.

Consequently, there is a need for a system for supporting articles more efficiently for transportation purposes. In particular, there is a need for such a support system that is of a highly efficient design whereby the deck can be economically installed in a vehicle, each individual intermediate deck can be adequately supported and locked together with other intermediate decks, and the system can be efficiently operated by a single user.

SUMMARY OF THE INVENTION

These and other objects and advantages are met by the present invention which includes a deck support system for supporting cargo in a vehicle freight compartment having spaced apart side walls.

The deck support system includes at least one pair of deck panels mounted opposite one another on the side walls, which are capable of movement between an upright position and a deployed position. Each of the respective deck panels have an end pivotably mounted to the side wall and a free end. When the deck panels are in the deployed position they at least partially define a secondary platform of the vehicle freight compartment when the free ends are adjacent to one another in the deployed position. The deck support system also includes one or more anchors mounted to each of the side walls of the freight compartment to secure the deck panels to the side walls in the upright position.

The system includes a support bracket that removably engages the deck panels adjacent the free ends when the deck panels are in the deployed position. In one embodiment, the support bracket removably engages the deck panels along a side edge of each panel. The support bracket interlocks the pair of deployed deck panels and provides a support ledge for other deck panels. The bracket has an elongated body, which preferably has a rectangular cross section and defines a longitudinal axis. The elongated body has a first side and a second side with a longitudinally extending channel defined in the first side, which is shaped for removable engagement with the pair of deck panels. The elongated body also has a longitudinally extending support ledge defined in its second side. The longitudinally extending channel of the bracket interlocks the deployed deck panels and the longitudinally extending support ledge is capable of providing support to further pairs of deployed deck panels.

In one embodiment, the longitudinally extending channel slidably engages the deployed deck panels and is capable of linear movement perpendicular to the mating faces of the deployed deck panels. In another embodiment, the first side of the elongated body of the bracket is pivotably secured to one of the deck panels of the pair and the longitudinally extending channel pivotably engages the deployed deck panels.

In a preferred embodiment, the deck support system also includes a horizontal starter panel secured at the front of the freight compartment between the side walls and adjacent at least one pair of the deployed deck panels. In this embodiment, a support bracket is secured to the starter panel to support a pair of deployed deck panels adjacent the starter panel.

Advantageously, the deck support system of the present invention supports articles more efficiently than prior art systems for transportation purposes. In particular, the deck support system is lightweight and is of highly efficient design whereby the deck can be economically installed in a vehicle, each individual intermediate deck is adequately supported and can be locked together with other decks, and the system can be efficiently operated by a single user.

BRIEF DESCRIPTION OF THE DRAWINGS

Some of the advantages of the present invention have been stated, others will appear as the description proceeds, when considered in conjunction with the accompanying drawings, which are not necessarily drawn to scale, in which.

DETAILED DESCRIPTION OF THE INVENTION

The present invention will now be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
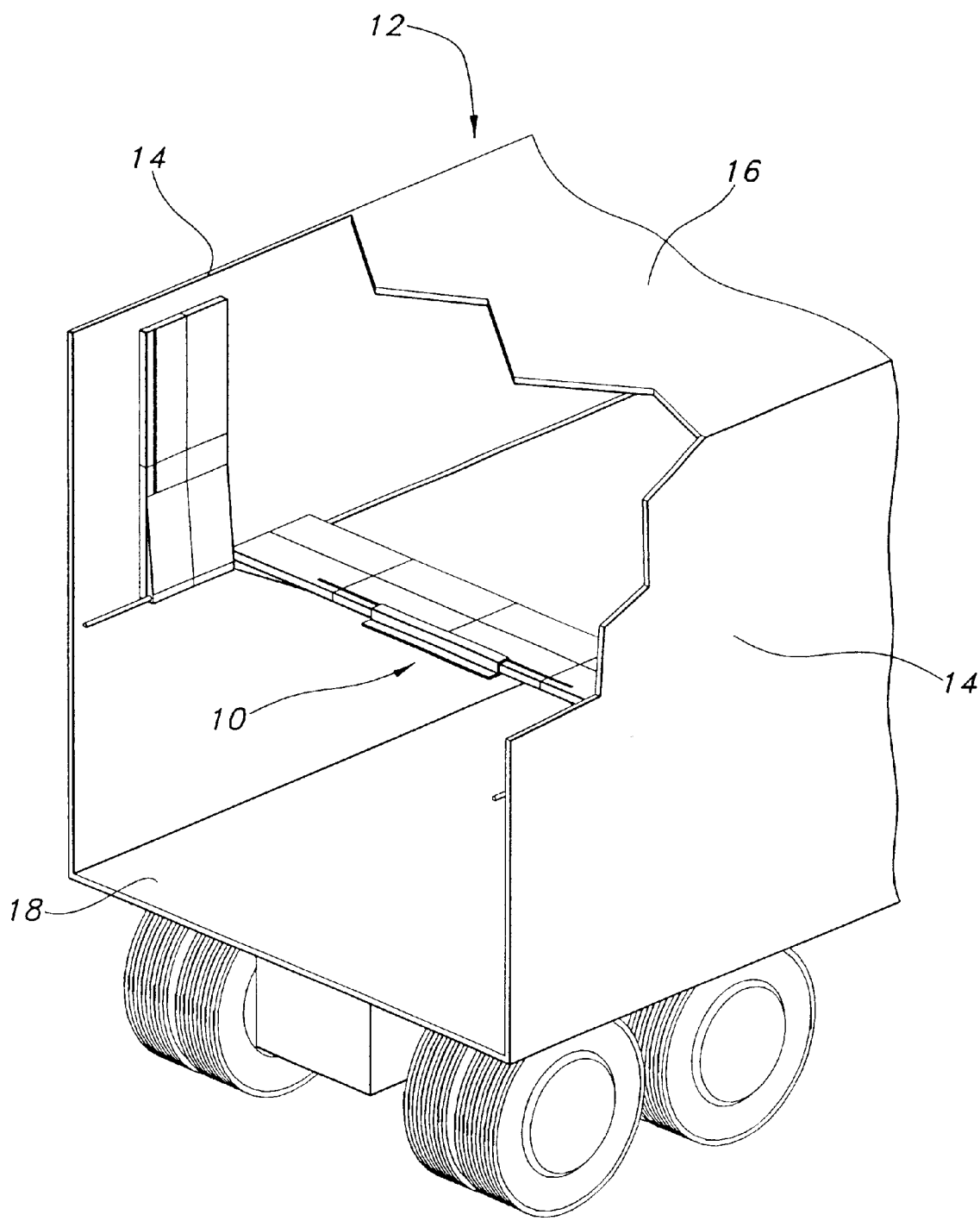
FIG. 1 is a perspective view, partially cutaway, of the rearward portion of a truck trailer including an embodiment of the deck support system in accordance with the present invention.

Referring to the accompanying drawings, FIGS. 1–11 illustrate a deck support system, indicated generally at 10 in FIG. 1, installed on a truck trailer 12. The truck trailer 12 is enclosed by side walls 14, a roof 16 and a floor 18. While the illustrated embodiment and the following description describe the deck support system of the present invention in conjunction with a truck trailer, the deck support system need not be used in conjunction with a truck trailer, but can instead be used in conjunction with various types of freight transport vehicles or devices such as railway cars, airplanes or transport containers.

Figure 2:
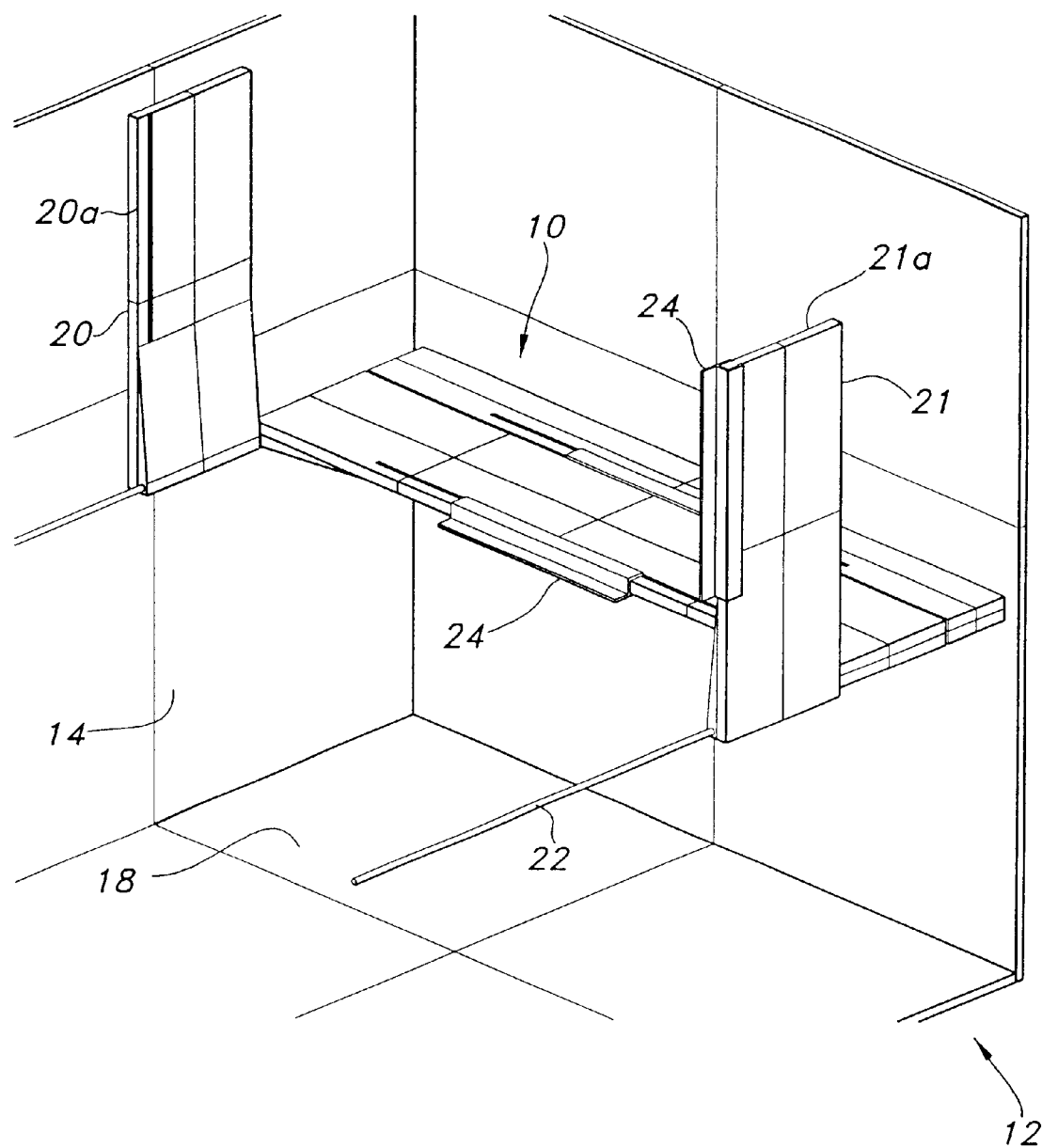
FIG. 2 is a perspective view of the interior forward portion of the truck trailer shown in FIG. 1 including an embodiment of the deck support system.
Figure 8:
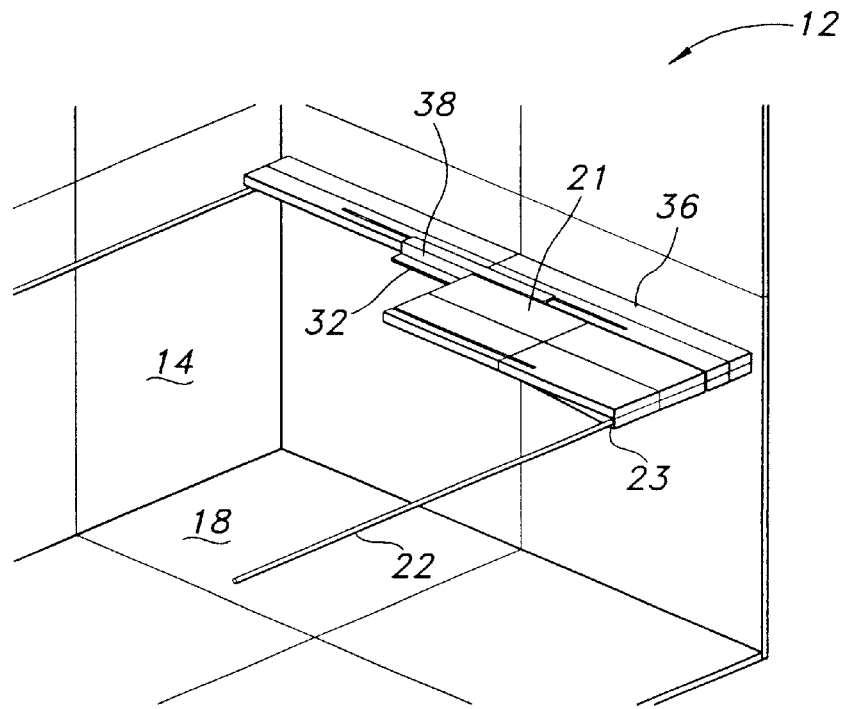
FIG. 8 is a perspective view of the interior forward portion of the truck trailer demonstrating placement of a deck panel of the deck support system.
Figure 9:
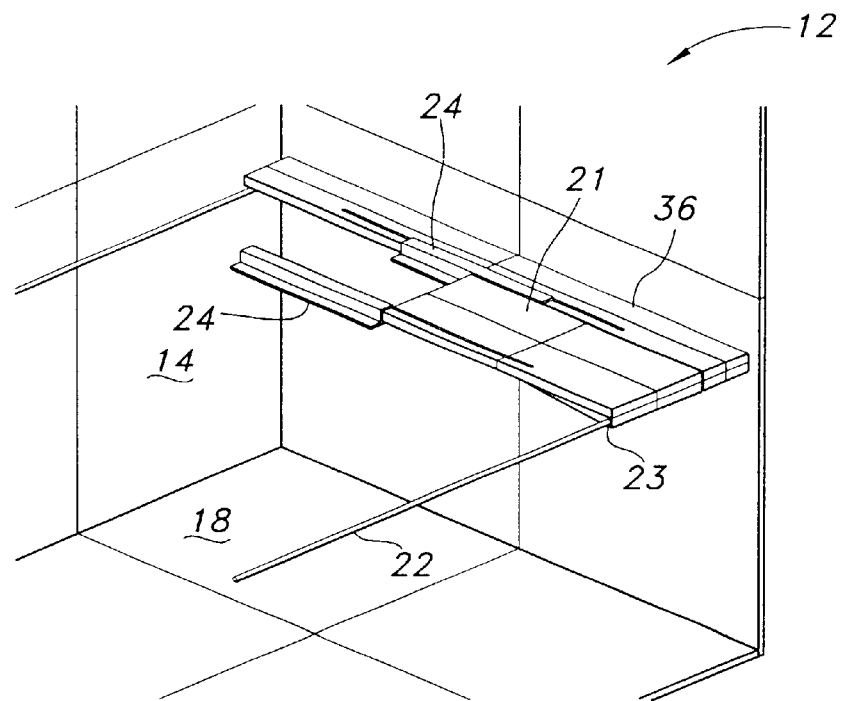
FIG. 9 is a perspective view of the interior forward portion of the truck trailer demonstrating placement of a support bracket over the deck panel shown in FIG. 8.

As best shown in FIG. 2, the deck support system 10 generally includes at least one pair of deck panels 20 and 21 mounted opposite one another on the side walls 14 of truck trailer 12. The pair of deck panels 20 and 21 are mounted on the side walls 14 by one or more anchors mounted to each of the side walls. In one embodiment, these anchors are horizontal rails 22 that generally run the length of truck trailer 12. The deck panels 20 and 21 are maintained in their upright position by locks (not shown) provided on the walls 14 of the truck trailer 12. As shown in FIGS. 8 and 9, the deck panels 20 and 21 are fitted with notched mounting brackets 23 that are designed to hook over horizontal rails 22. In this way, the deck panels 20 and 21 may rotate about horizontal rails 22 between a stored upright position and an extended horizontal deployed position, both as shown in FIG. 2. The deck panels 20 and 21 have free ends 20a and 21a, respectively. When the deck panels 20 and 21 are deployed and their respective free ends 20a and 21a are adjacent, the deck panels 20 and 21 at least partially define a platform in truck trailer 12 above the floor 18.

Figure 3:
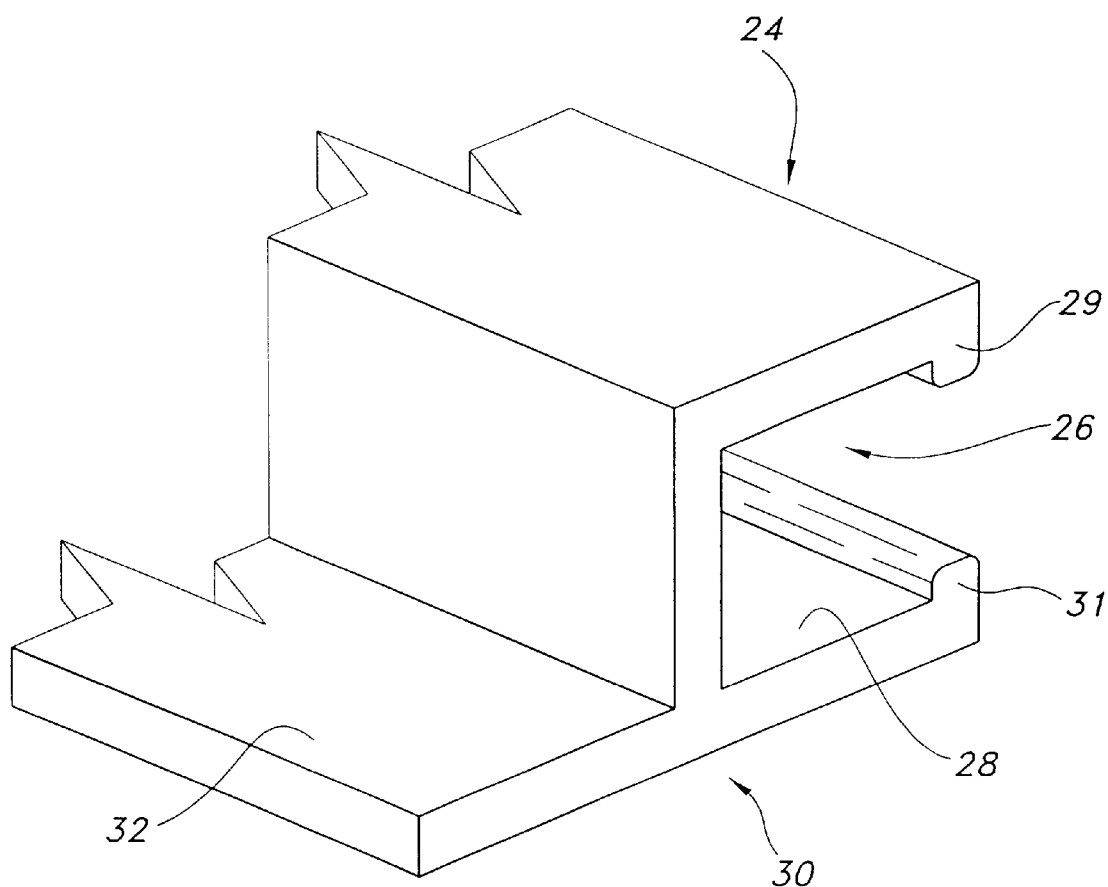
FIG. 3 is a perspective view of a support bracket of the deck support system.

The deck support system 10 also includes a support bracket 24, which is preferably removably mounted between each pair of extended deck panels 20 and 21 to both interlock the pairs of deck panels 20 and 21 together and provide support to the pairs of deck panels 20 and 21. As shown in FIG. 3, the interlocking support bracket 24 has an elongated body and preferably is of a rectangular cross section. The support bracket 24 includes a first side 26 defining a longitudinally extended channel 28. The support bracket 24 also includes a second side 30 defining a longitudinally extending support ledge 32.

Figure 4:
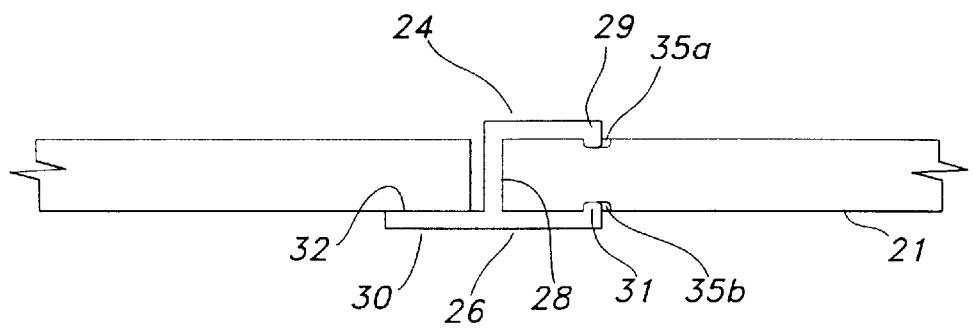
FIG. 4 is a side view of a support bracket slidably secured to a deck panel.
Figure 5:
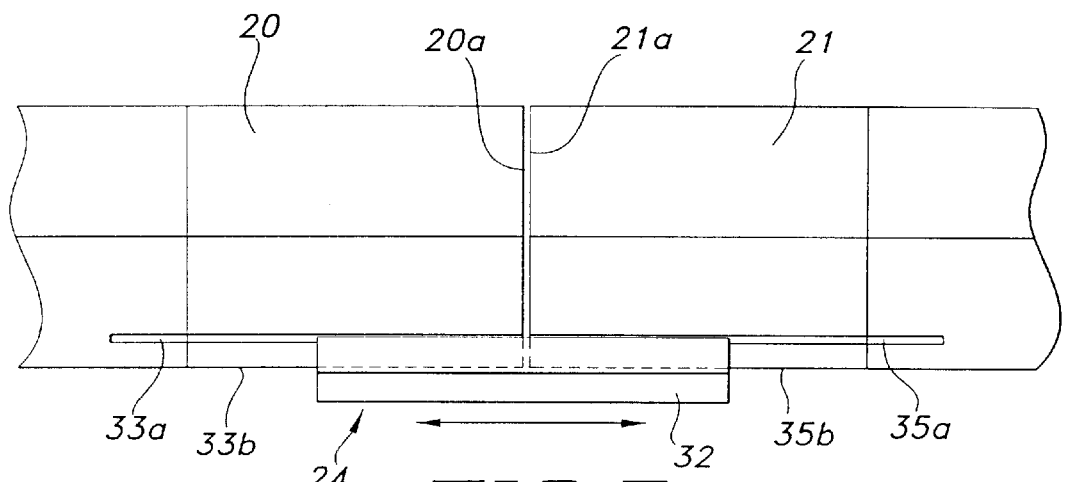
FIG. 5 is a plan view of the secured support bracket of FIG. 4.
Figure 11:
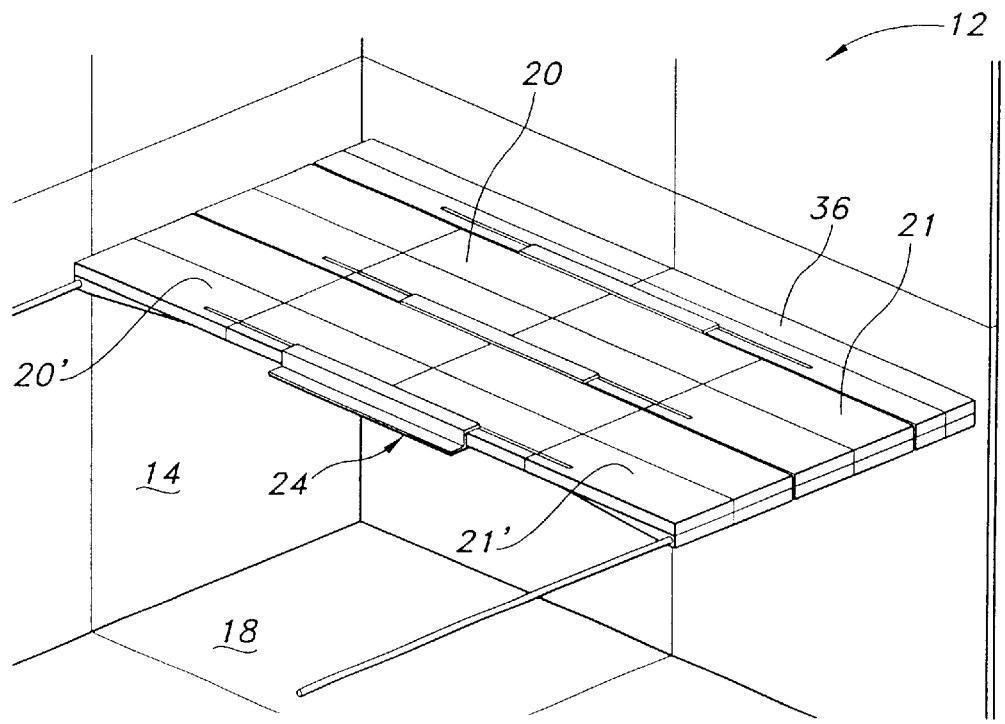
FIG. 11 is a perspective view of the interior forward portion of the truck trailer demonstrating the deck support system of the present invention.

In the embodiment shown in FIG. 3, the longitudinally extending channel 28 has an upper lip 29 and a lower lip 31. The lips 29 and 31 preferably extend the length of channel 28. As shown in FIGS. 4 and 5, the longitudinally extending channel 28 of support bracket 24 preferably engages the edge of deck panels 20 and 21 by virtue of the upper lip 29 and the lower lip 31. The upper lip 29 and the lower lip 31 engage a series of grooves in deck panels 20 and 21. In particular, the deck panel 20 includes an upper groove 33a and a lower groove 33b, and the deck panel 21 includes an upper groove 35a and a lower groove 35b. In order to removably and slidably engage the deck panels 20 and 21, the upper lip 29 of support bracket 24 engages upper groove 33a of panel 20 and upper groove 35a of panel 21. Similarly, the lower lip 31 of support bracket 24 engages lower groove 33b of panel 20 and lower groove 35b of panel 21. By engaging the deck panels 20 and 21 in this way, the support bracket 24 is capable of linear travel across the faces of deck panels 20 and 21 when the deck panels are deployed. At the same time, the longitudinally extending channel 28 of the support bracket 24 interlocks the deployed deck panels 20 and 21 and the longitudinally extending support ledge 32 provides support to further pairs of adjacent deployed deck panels 20' and 21' as shown in FIG. 11. The grooves 35a, 35b are at least as long as the support bracket 24, so that the bracket 24 can be stored with the deck panel 21 without protruding past its free end 21a.

Figure 7:
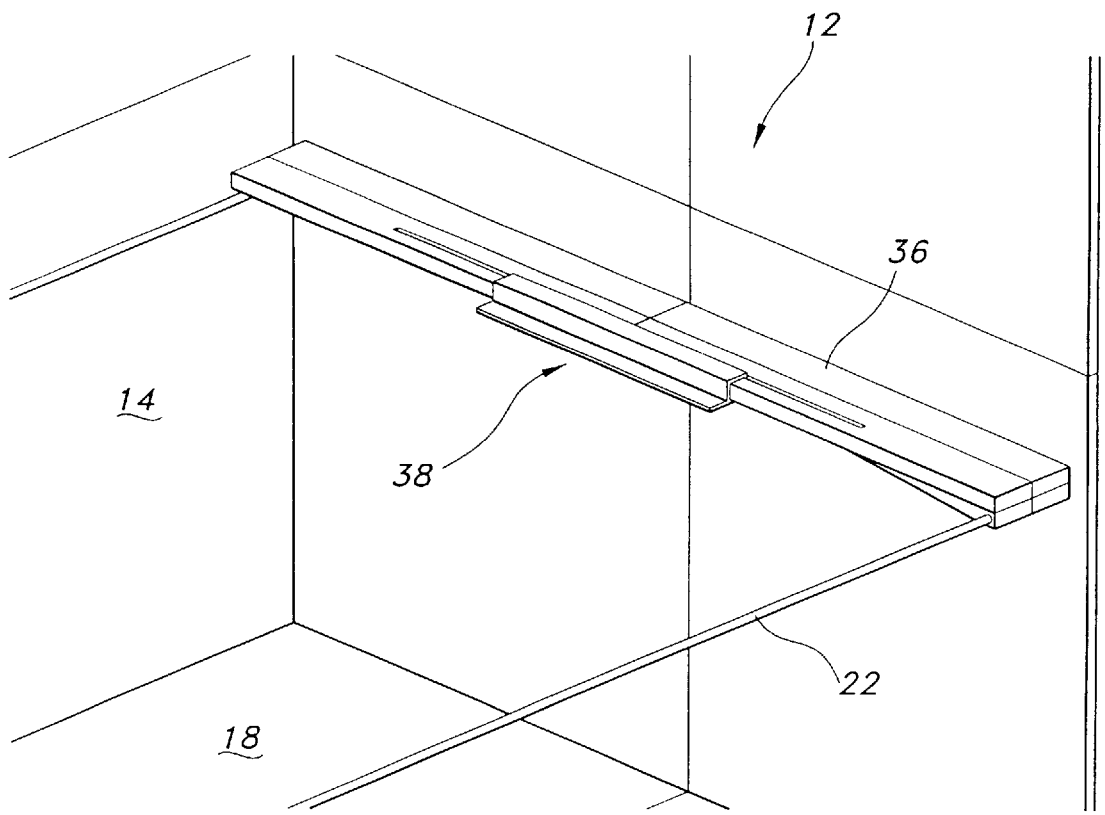
FIG. 7 is a perspective view of the interior forward portion of the truck trailer demonstrating a horizontal starter panel and a support bracket of the deck support system.

Referring to FIGS. 7 through 11, a secondary platform in truck trailer 12 may be constructed using the above described embodiment of the deck support system 10 by first securing a starter panel 36 to the horizontal rails 22 between the vertical walls 14 and against the forward part of truck trailer 12 as shown in FIG. 7. Although in this embodiment the starter panel 36 is secured against the forward part of the truck trailer 12, one of ordinary skill in the art will understand that starter panel 36 may be installed at any location in the trailer 12 where the user desires to start building a secondary platform within the truck trailer 12. Preferably, starter panel 36 is a continuous shelf that extends between the vertical walls 14.

A bracket 38 may next be secured to starter panel 36 so that support ledge 32 provides a way to support subsequent deployed deck panels 20 and 21. The first bracket 38 is preferably rigidly secured to starter panel 36, but alternatively may be slidably secured thereon such as by a lip and groove design. As shown in FIG. 8, after the bracket 38 is in place the deck panel 21 is rotated from its upright position against wall 14 to its deployed position, resting on the bracket 38. In the alternative, a simple flange may be attached to the forward trailer wall to support the first pair of deck panels to provide the same function as support ledge 32.

Figure 10:
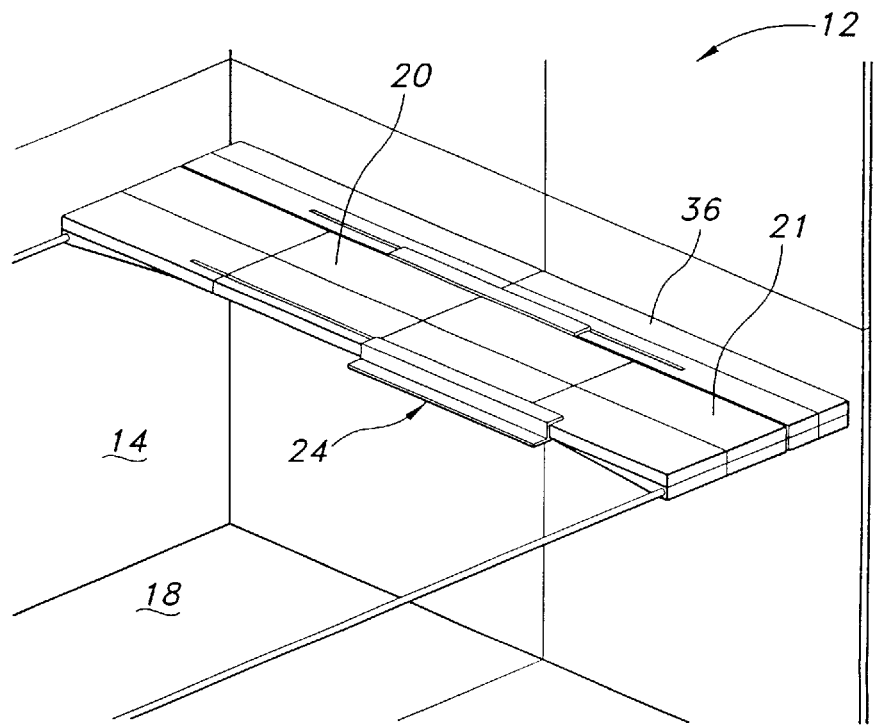
FIG. 10 is a perspective view of the interior forward portion of the truck trailer demonstrating placement of a deck panel of the deck support system.

Next, as shown in FIG. 9, a support bracket 24 is slid over the deck panel 21 to prepare for the horizontal deployment of the deck panel 20 on the opposite side wall of truck trailer 12. The support bracket 24 may either stored somewhere on the trailer and be slid over the deck panel 21 (as described) or may be included on the deck panel 21 while the deck panel 21 is in its upright position. As shown in FIG. 10, the support bracket 24 is slid onto the deck panel 21 out of the way of the deck panel 20, and then the deck panel 20 is deployed to its horizontal position. The support bracket 24 is then slid back until it engages both deck panel 20 and deck panel 21. The support bracket 24 engages the deck panels 20 and 21 by virtue of the engagement of upper lip 29 and lower lip 31 on the support bracket 24 with the upper groove 33a and lower groove 33b of deck panel 20, and the upper groove 35a and lower groove 35b of deck panel 21.

As shown in FIG. 5, preferably the upper grooves 35a, 35b of deck panel 21 are longer than upper grooves 33a, 33b of deck panel 20. Because of this, the support bracket 24 can travel further onto deck panel 21 and completely out of the way of the deck panel 20. On the other hand, when the support bracket 24 engages the deck panel 20, preferably it may only travel far enough to provide complete engagement between the deck panel 20 and the deck panel 21. Thus, after the deck panel 20 is deployed, the support bracket 24 is slid back onto the deck panel 20 so that it slidably engages both deck panels 20 and 21 and locks them together. This process is repeated, as demonstrated in FIG. 11, until the desired number of deck panels are extended from their vertical position so that a sufficient amount of secondary platform space is created in truck trailer 12 for the storage of articles.

Figure 6:
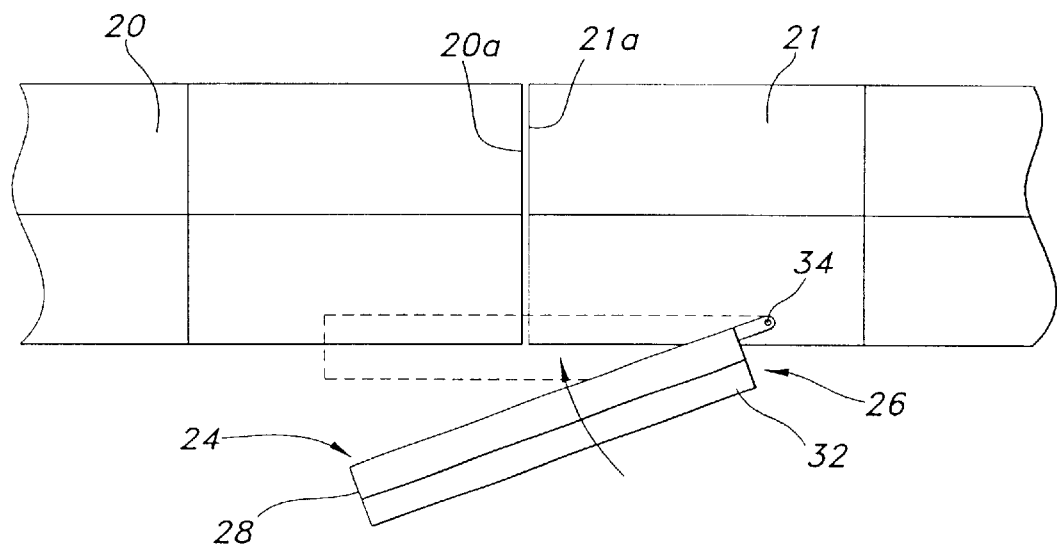
FIG. 6 is a plan view of a support bracket pivotably secured to a deck panel.

In another embodiment of the deck support system, shown in FIG. 6, the support bracket 24 does not include an upper lip 29 and lower lip 31 and the deck panels 20 and 21 do not include a series of grooves. Instead, the support bracket 24 includes only a longitudinally extending channel 28 and a longitudinally extending support ledge 32. In this embodiment, support bracket 24 is rotatably secured to one of the two deck panels 20 and 21 of the pair. This may be done, for example, by a pivot pin 34 secured through the first side 26 of support bracket 24. The support bracket 24 can be rotated into position to interlock the deck panels 20 and 21 when the deck panels 20 and 21 are deployed to the horizontal position, thereby providing the interlocking and support for the deck panels 20 and 21.

In this embodiment, a secondary platform in truck trailer 12 may be constructed using the deck support system 10 by first securing a starter panel 36 to the horizontal rails 22 between the vertical walls 14 and against the forward part of truck trailer 12 as shown in FIG. 7. Again, preferably, starter panel 36 is a continuous shelf that extends between the walls 14. A bracket 38 may next be secured to starter panel 36 so that support ledge 32 provides a way to support subsequent deployed deck panels 20 and 21. After the bracket 38 is in place, the deck panel 21 is rotated from its upright position against wall 14, with the support bracket 24 pivotably secured to the panel 21, to its deployed position, resting on the bracket 38.

The support bracket 24 is rotated out of the way of the path of rotation of the deck panel 20 to prepare for the horizontal deployment of the deck panel 20. The deck panel 20 is then deployed to its horizontal position and the support bracket 24 is rotated into position, as demonstrated in FIG. 6, so that it engages both the deck panel 20 and the deck panel 21 and provides a support ledge for subsequently deployed deck panels. Again, this process is repeated until the desired number of deck panels are extended from their vertical position so that a sufficient amount of secondary floor space is created in truck trailer 12 for the storage of articles.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed:

1. A deck support system for supporting cargo in a freight compartment having spaced apart side walls, comprising:
    at least one pair of deck panels mounted opposite one another on the side walls and capable of movement between an upright position and a deployed position, each respective deck panel having,
        an end pivotably mounted to one of the side walls, and
        a free end,
    wherein said deck panels at least partially define a platform when said free ends are adjacent to one another in the deployed position; and
        a support bracket removably engaging said deck panels adjacent said free ends when said deck panels are in the deployed position, said bracket interlocking said pair of deployed deck panels and providing a support ledge for other said deck panels.

2. The deck support system as defined in claim 1 wherein said support bracket removably engages said deck panels along a side edge of each said panel.

3. The deck support system as defined in claim 1, said support bracket comprising:
    an elongated body defining a longitudinal axis, said elongated body including;
        a first side and a second side;
        a longitudinally extending channel defined in said first side and shaped for removable engagement with one pair of said deck panels; and
        a longitudinally extending said support ledge defined in said second side;
    wherein the longitudinally extending channel interlocks the deployed deck panels and the longitudinally extending support ledge is capable of providing support to further pairs of adjacent deployed deck panels.

4. The deck support system as defined in claim 3 wherein said longitudinally extending channel slidably engages said pair of deployed deck panels and is capable of linear movement perpendicular to the free ends of said deployed deck panels.

5. The deck support system as defined in claim 3 wherein said first side of said elongated body is pivotably secured to one of said deck panels of said pair and said longitudinally extending channel pivots to engage said deployed deck panels.

6. The deck support system as defined in claim 1, further comprising a horizontal starter panel secured between the side walls and adjacent at least one pair of said deployed deck panels.

7. The deck support system as defined in claim 6, further comprising a support bracket secured to said starter panel for supporting a pair of deployed deck panels adjacent said starter panel.

8. The deck support system as defined in claim 6, wherein said support bracket is movably secured to said starter panel.

9. A deck support system for supporting cargo in a freight compartment having spaced apart side walls, comprising:
    at least one pair of deck panels mounted opposite one another on the side walls and capable of movement between an upright position and an extended horizontal deployed position, each respective deck panel having, an end pivotably mounted to one of the side walls, and a free end,
    wherein said deck panels at least partially define a secondary platform when said free ends are adjacent to one another in the deployed position; and
        a support bracket removably engaging said deck panels adjacent said free ends when said deck panels are in the deployed position, said support bracket removably engaging said deck panels along a side edge of each panel,
    said support bracket including:
        an elongated body defining a longitudinal axis, said elongated body having,
        a first side and a second side;
        a longitudinally extending channel defined in said first side shaped for removable engagement with one pair of said deck panels; and
        a longitudinally extending support ledge defined in said second side;
    wherein the longitudinally extending channel interlocks the deployed deck panels and the longitudinally extending support ledge is capable of providing support to further pairs of adjacent deployed deck panels.

10. The deck support system as defined in claim 9 wherein said longitudinally extending channel slidably engages said pair of deployed deck panels and is capable of linear movement perpendicular to the free ends of said deployed deck panels.

11. The deck support system as defined in claim 9, wherein said first side of said elongated body is pivotably secured to one of said deck panels of said pair and said longitudinally extending channel pivots to engage said deployed deck panels.

12. The deck support system as defined in claim 9, further comprising a horizontal starter panel secured between the side walls and adjacent at least one pair of said deployed deck panels.

13. The deck support system as defined in claim 12, further comprising a support bracket secured to said starter panel for supporting a pair of deployed deck panels adjacent said starter panel.

14. The deck support system as defined in claim 13, wherein said support bracket is movably secured to said starter panel.

15. A support bracket for use with deck panels mounted to the side walls in a cargo freight compartment in a deck support system, comprising:
- an elongated body defining a longitudinal axis, said elongated body including;
  - a first side and a second side;
  - a longitudinally extending channel defined in said first side of said elongated body and shaped for removable engagement with one pair of said deck panels; and
  - a longitudinally extending support ledge defined in said second side of said elongated body;
- wherein the longitudinally extending channel is capable of interlocking the deployed deck panels and the longitudinally extending support ledge interlock is capable of providing support to further pairs of adjacent deployed deck panels.

16. The support bracket as defined in claim 15, wherein said longitudinally extending channel slidably engages said pair of deployed deck panels and is capable of linear movement perpendicular to the mating faces of said deployed deck panels.

17. The bracket as defined in claim 15, wherein said first side of said elongated body is pivotably secured to one of said deck panels of said pair and said longitudinally extending channel pivots to engage said deployed deck panels.

18. A freight trailer, comprising:
- a trailer having a floor and at least two spaced apart side walls;
- a plurality of deck panels mounted opposite one another on the side walls and capable of movement between an upright position and a horizontal deployed position, each respective deck panel having,
  - an end pivotably mounted to the side wall, and a free end,
- wherein said deck panels at least partially define a platform in said trailer spaced above said floor when said free ends are adjacent to one another in the deployed position; and
- a support bracket removably engaging said deck panels adjacent said free ends when said deck panels are in the deployed position, said bracket interlocking said pair of deployed deck panels and providing a support ledge for other said deck panels.

19. The freight trailer as defined in claim 18, wherein said support bracket removably engages said deck panels along a side edge of each said panel.

20. The freight trailer as defined in claim 18, further comprising a horizontal starter panel secured between the side walls and adjacent at least one pair of said deployed deck panels.

21. The freight trailer as defined in claim 20, further comprising a support bracket secured to said starter panel for supporting a pair of deployed deck panels adjacent said starter panel.

22. The freight trailer as defined in claim 20, wherein said support bracket is movably secured to said starter panel.

23. The freight trailer as defined in claim 18, said support bracket comprising
- an elongated body defining a longitudinal axis, said elongated body including;
  - a first side and a second side;
  - a longitudinally extending channel defined in said first side and shaped for removable engagement with one pair of said deck panels; and
  - a longitudinally extending support ledge defined in said second side;
- wherein the longitudinally extending channel interlocks the deployed deck panels and the longitudinally extending support ledge is capable of providing support to further pairs of adjacent deployed deck panels.

24. The freight trailer as defined in claim 23 wherein said longitudinally extending channel slidably engages said pair of deployed deck panels and is capable of linear movement perpendicular to the mating faces of said deployed deck panels.

25. The freight trailer as defined in claim 23 herein said first side of said elongated body is pivotably secured to one of said deck panels of said pair and said longitudinally extending channel pivots to engage said deployed deck panels.

* * * * *

UNITED STATES PATENT AND TRADEMARK OFFICE
CERTIFICATE OF CORRECTION

PATENT NO.    : 6,585,306 B1
DATED         : July 1, 2003
INVENTOR(S)   : Smith et al.

It is certified that error appears in the above-identified patent and that said Letters Patent is hereby corrected as shown below:

Column 9,
Lines 42-43, insert -- a -- before "free end" in Line 43.

Column 10,
Line 40, "herein" should read -- wherein --.

Signed and Sealed this

Fourth Day of November, 2003

JAMES E. ROGAN
*Director of the United States Patent and Trademark Office*